US011953172B2

(12) United States Patent
Röhm et al.

(10) Patent No.: US 11,953,172 B2
(45) Date of Patent: Apr. 9, 2024

(54) LIGHT MODULE HAVING A PLURALITY OF PRELIMINARY LENSES

(71) Applicant: Marelli Automotive Lighting Reutlingen (Germany) GmbH, Reutlingen (DE)

(72) Inventors: Felix Röhm, Böblingen (DE); Armin Austerschulte, Stuttgart (DE); Emanuel Schild, Reutlingen (DE); Isabell Emmerich, Wendlingen (DE)

(73) Assignee: Marelli Automotive Lighting Reutlingen (Germany) GmbH, Reutlingen (DE)

( * ) Notice: Subject to any disclaimer, the term of this patent is extended or adjusted under 35 U.S.C. 154(b) by 0 days.

(21) Appl. No.: 18/312,040

(22) Filed: May 4, 2023

(65) Prior Publication Data

US 2023/0358383 A1 Nov. 9, 2023

(30) Foreign Application Priority Data

May 4, 2022 (DE) ..................... 10 2022 111 039.7

(51) Int. Cl.

*F21S 41/151* (2018.01)
*F21S 41/147* (2018.01)
*F21S 41/27* (2018.01)
*F21S 41/365* (2018.01)
*F21V 5/00* (2018.01)

(52) U.S. Cl.

CPC ............ *F21S 41/27* (2018.01); *F21S 41/147* (2018.01); *F21S 41/365* (2018.01)

(58) Field of Classification Search

CPC ...... F21S 41/147; F21S 41/151; F21S 41/153; F21S 41/25-275; F21V 5/007

See application file for complete search history.

(56) References Cited

U.S. PATENT DOCUMENTS 6,527,411 B1 * 3/2003 Sayers .................... F21S 41/24 362/555
2014/0321143 A1 10/2014 Hossfeld et al.
2019/0154222 A1 5/2019 Iwasaki

FOREIGN PATENT DOCUMENTS

CN 106439680 A 2/2017
DE 10137336 A1 3/2003
DE 102013207850 A1 10/2014
DE 112017000365 B4 12/2020
EP 2799761 A2 11/2014

(Continued)

OTHER PUBLICATIONS

Search Report for German Patent Application No. 102022111039.7 dated Jan. 16, 2023.

(Continued)

*Primary Examiner* — Sean P Gramling

(74) *Attorney, Agent, or Firm* — Howard & Howard Attorneys PLLC

(57) ABSTRACT

The invention relates to a light module for a motor vehicle headlamp that has semiconductor light sources and a primary lens unit, wherein the primary lens unit comprises preliminary lenses. The light deflection surfaces in the preliminary lenses each have a first subsection and second subsection, wherein the curvatures and/or slopes of the subsections differ, such that the directions of the optical axes in the first subsections differ from the directions of the optical axes in the second subsections.

13 Claims, 10 Drawing Sheets

(56) References Cited

FOREIGN PATENT DOCUMENTS

| | | | |
|---|---|---|---|
| WO | 0175487 | A2 | 10/2001 |
| WO | 2011154470 | A1 | 12/2011 |
| WO | 2021208536 | A1 | 10/2021 |

OTHER PUBLICATIONS

Communication dated Oct. 9, 2023 for European Patent Application No. 23169615.4 transmitting the European Search Report dated Sep. 27, 2023.

* cited by examiner

LIGHT MODULE HAVING A PLURALITY OF PRELIMINARY LENSES

CROSS-REFERENCE TO RELATED APPLICATIONS

The present application which claims priority to and all the benefits of German Patent Application No. 10 2022 111 039.7, filed on May 4, 2022, which is hereby expressly incorporated herein by reference.

BACKGROUND OF THE INVENTION

1. Field of the Invention

The invention relates to a light module for a motor vehicle headlamp that includes at least two semiconductor light sources, each of which has a dedicated preliminary lens. These preliminary lenses are connected to one another to form a horizontal primary lens unit, and are adjacent to one another along the horizontal axis of the primary lens unit.

2. Description of the Related Art

DE 10 2013 207 850 A1 discloses a light module having preliminary lenses that include a light entry surface, each of which has a central light entry region and a peripheral light entry region, as well as a light deflection region surrounding the peripheral light entry region.

The light modules in the prior art have the disadvantage that the primary lenses are relatively large, and have sharp edged separations between the light emitting surfaces of the individual preliminary lenses, making them difficult to work with.

SUMMARY OF THE INVENTION

The fundamental object of the present invention is to eliminate the disadvantages in the prior art.

These problems are solved by a light module including at least two semiconductor light sources, and at least one primary lens unit that defines an outer edge. The primary lens unit includes at least two preliminary lenses, each dedicated to a respective semiconductor light source. The preliminary lenses are adjacent to one another along a horizontal axis of the primary lens unit and include a light entry surface with a central light entry region, a peripheral light entry region, and a light deflection surface surrounding the peripheral light entry region. The light deflection region in each preliminary lens includes a first subsection and a second subsection, with the first subsection being closer to the middle of the primary lens unit along the horizontal axis than the second subsection. The second subsection is closer to the outer edge of the primary lens unit along the horizontal axis than the first subsection. A curvature and/or slope of the first subsection is flatter than a curvature and/or slope of the second subsection, starting from the peripheral light entry region, and curvature and/or slope of the second subsection is steeper than the curvature and/or slope of the first subsection, starting from the peripheral light entry region, such that the direction of the first optical axis in the first subsection differs from the direction of the second optical axis in the second subsection.

Light beams deflected at the first subsection of the light deflection region in each preliminary lens are deflected in a different direction than the light beams deflected at the second subsection of the light deflection region in each preliminary lens.

The deflection of the light in a direction other than the main beam direction of the light module according to the invention is obtained with the design of the light deflection region described above. Thus, the deflection no longer takes place in the light emitting surfaces of the preliminary lenses, and the light emitting surfaces on the preliminary lenses to not need to be tilted or slanted significantly for this. The primary lens as a whole can be flatter. In the prior art, the deflection region of the preliminary lens is rotationally symmetrical, such that there is no mean deflection of the light from the optical axis of the light source. In this case, deflection is obtained through the prismatic effect of the light emitting surface by tilting the light emitting surface in relation to a surface that is perpendicular to the optical axis of the light source. This requires a larger installation space.

According to the present invention, because of the different curvatures and/or slopes of the two subsections, the surface of the first subsection, which is closer to the center of the primary lens unit, is flatter in relation to the peripheral light entry region. Thus, the peripheral light entry region is at a greater angle to the surface of the first subsection than to the second subsection. Accordingly, the surface of the second subsection, which is closer to the outer edge of the primary lens unit, is steeper in relation to the peripheral light entry region. Thus, the peripheral light entry region is at less of an angle to the surface of the second subsection than to the first subsection.

As a result, the light beams from the semiconductor light sources strike the first subsection at a flatter angle and the second subsection at a steeper angle in the middle, and are therefore deflected differently.

The light entry surface, comprising the central and peripheral light entry regions, is rotationally symmetrical. The light deflection region surrounding the peripheral light entry region is not rotationally symmetrical because of the differences in the slopes and/or curvatures of the surfaces forming the light deflection region. The preliminary lenses can therefore be referred to as preliminary lenses with asymmetrical light deflection surfaces.

In one advantageous embodiment, a low beam light distribution or a partial light distribution of a low beam light distribution is generated with the light module, and light beams that are deflected at the first subsections of the preliminary lenses light a central region of the low beam light distribution on a measurement screen placed in front of the light module at a distance thereto in the region surrounding the intersection of the horizontal and vertical planes. The light beams deflected at the first subsection therefore light a central region of the low beam light distribution. The central region spans the area ±15° along the horizontal axis on the measurement screen. The low beam light distribution has a substantially horizontal light/dark boundary, which delimits the upper edge of the light distribution, and lies just below or above the horizontal plane, e.g. at ±1°. In the vertical direction, the central region on the measurement screen extends from −10°, particularly −7°, to the light/dark boundary. The light/dark boundary is preferably asymmetrical, such that it is higher on the side in which the vehicle is travelling than on the side directed toward oncoming traffic, in order to avoid blinding oncoming traffic. The transition between the sections of the light/dark boundary from the direction of travel side to the oncoming traffic side can have an arbitrary form, e.g. forming a steep diagonal or an abrupt step.

An individual subsection, for example each first subsection of an individual preliminary lens, or each preliminary lens, could light the entire central region of the low beam light distribution. The first subsections can also each light a part of the central region and the entire central region of the low beam light distribution can be lit by superimposing the lit parts of the central region.

According to one advantageous embodiment of the invention, the light beams deflected at the second subsections of the preliminary lenses light a wide area in the low beam light distribution along the horizontal plane, and this wide area is wider along the horizontal plane than the central region lit by the first subsections.

The second regions of the preliminary lenses therefore result in a particularly wide fundamental light distribution in the low beam light distribution. The wide area of the low beam light distribution extends along the horizontal plane in an area spanning up to ±45°, particularly ±35°, by way of example. In the vertical plane, the wide area on the measurement screen extends to −15°, particularly −12°, below the light/dark boundary.

A single second subsection, for example each second subsection of an individual preliminary lens, or each preliminary lens, can light the entire wide area of the low beam light distribution. The second subsections can also each light part of the wide area, and the entire wide area in the low beam light distribution can be lit by superimposing the lit parts of the wide area.

It is advantageous when a partial light distribution of the low beam light distribution is generated with each preliminary lens in the primary lens unit, and the overall low beam light distribution is obtained by superimposing the partial light distributions.

The first and second subsections advantageously transition smoothly into one another. Thus, the light deflection region in the preliminary lens does not have a step or an edge. This is advantageous because the light distribution will not have a step or an edge. Light deflected at the light deflection region can therefore contribute to the light distribution in a homogenous manner. The preliminary lenses and the primary lens can therefore be very flat in the direction of the optical axis. It is also easier to remove these primary lenses from the molds used in the production process, e.g. an injection molding process.

Each light deflection region in each of the preliminary lenses can be subdivided into the first and second subsections along a vertical plane that is perpendicular to the horizontal axis, or along a diagonal plane in relation to the horizontal axis, in one embodiment according to the invention.

According to one embodiment, the primary lens can comprise a preliminary lens located in the middle, between the at least two other preliminary lenses, which has a symmetrical light deflection region, in particular rotationally symmetrical, or symmetrical in relation to a vertical axis.

According to one embodiment of the invention, there can be between three and nine, particularly between five and seven, adjacent light sources, in which case the primary lens comprises between three and nine, particularly between five and seven, preliminary lenses, each of which is dedicated to a semiconductor light source. The semiconductor light sources and the preliminary lenses collectively generate the low beam light distribution, e.g. by superimposing the regions lit by each semiconductor light source and each preliminary lens.

It has also proven to be advantageous if the primary lens has a light emitting surface, and each of the regions of the light emitting surface dedicated to a respective preliminary lens transition smoothly into one another. The primary lens therefore comprises a smooth light emitting surface. The light emitting surface on the primary lens therefore has no steps or edges. This is advantageous because no steps or edges will appear in the light distribution. Moreover, the primary lens can be more easily removed from a mold in the production process, e.g. an injection molding process.

According to another advantageous embodiment of the invention, there is another set of at least two other adjacent preliminary lenses above or below the at least two adjacent preliminary lenses. The primary lens can therefore comprise two rows of at least two preliminary lenses each. There can also be two separate primary lenses, each comprising two adjacent preliminary lenses.

The at least two other adjacent preliminary lenses in the second set each have at least one dedicated semiconductor light source. The second set of preliminary lenses generates a high beam light distribution, or a partial high beam light distribution according to one embodiment of the invention. By way of example, a partial light distribution can be generated with the second set of preliminary lenses that supplements the low beam light distribution with another area above the horizontal plane to obtain a high beam light distribution.

The design of the preliminary lenses for generating the high beam light distribution can be the same as that for the lenses for generating the low beam light distribution, with the condition that the subsections of light deflection surfaces are designed such that light deflected at the subsections is deflected into corresponding regions of the partial light distribution.

According to another embodiment of the invention, there is a shutter assembly, in particular comprising a reflecting shutter. The shutter assembly is used to define the light/dark boundary and is placed in the beam path of the light module. It is also preferred that one or both sides of the shutters are reflective. Because of the flat design of the primary lens unit obtained with the invention, it is possible to use existing shutter assemblies that were originally used with a reflector assembly, in combination with the preliminary lenses according to the invention.

The light module may also include a secondary lens, in particular a projection lens. This secondary lens projects light onto the roadway in front of the motor vehicle.

Further advantages can be derived from the following description, the drawings, and the dependent claims. It is understood that the features specified above and described below can be used not only in the respective given combinations, but also in other combinations or in and of themselves, without abandoning the scope of the present invention.

BRIEF DESCRIPTION OF THE DRAWINGS

Exemplary embodiments of the invention are illustrated in the drawings, and shall be explained in greater detail in the following description. Elements that have the same or similar functions have the same reference symbols in the drawings. Therein, schematically.

DETAILED DESCRIPTION OF THE INVENTION

Figure 1:
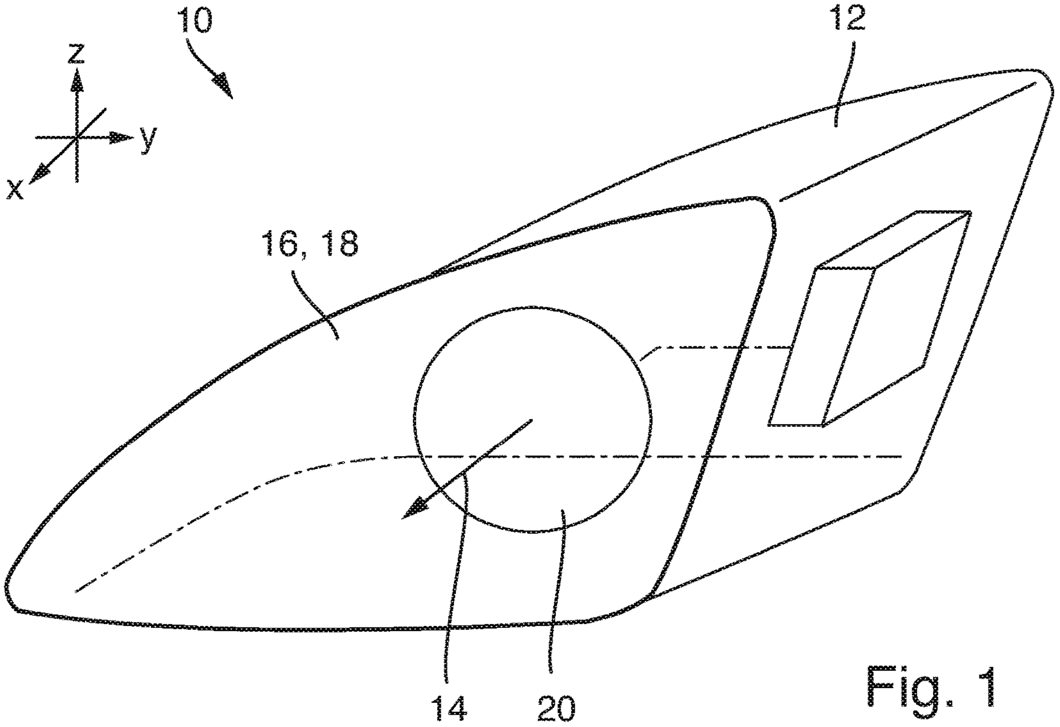
FIG. 1 shows a side view of a motor vehicle headlamp with a light module according to the invention according to a first embodiment.

FIG. 1 shows a motor vehicle headlamp, indicated as a whole with the reference numeral 10. The motor vehicle headlamp 10 comprises a housing 12 that, in one embodiment, is made of plastic. The housing 12 has a light emitting hole 16 in the direction 14 in which light is emitted, which is covered by a transparent cover plate 18. The cover plate 18 is made of transparent plastic or glass. The plate 18 can be a clear plate with a surface that generates no optical effects. Alternatively, the plate 18 can have a surface with contours for generating optical effects (e.g. in the form of cylindrical lenses or prisms) which diffuse the light passing through it, preferably horizontally. The headlamp 10 is designed for installation in a motor vehicle. Two of these headlamps 10, placed on different sides of the motor vehicle, form a motor vehicle lighting assembly according to the invention. These headlamps are designed such that they appear to be symmetrical to one another.

A light module 20 is located inside the headlamp housing 12 in this example. As a matter of course, more than just the light module 20 shown here can be located in the headlamp housing 12. The light module 20 generates at least one light distribution that satisfies legal and regulatory requirements.

In the present example, the light module 20 is a light module according to the invention. The light module 20 shall be explained in detail below in reference to FIGS. 2 to 9.

Figure 2:
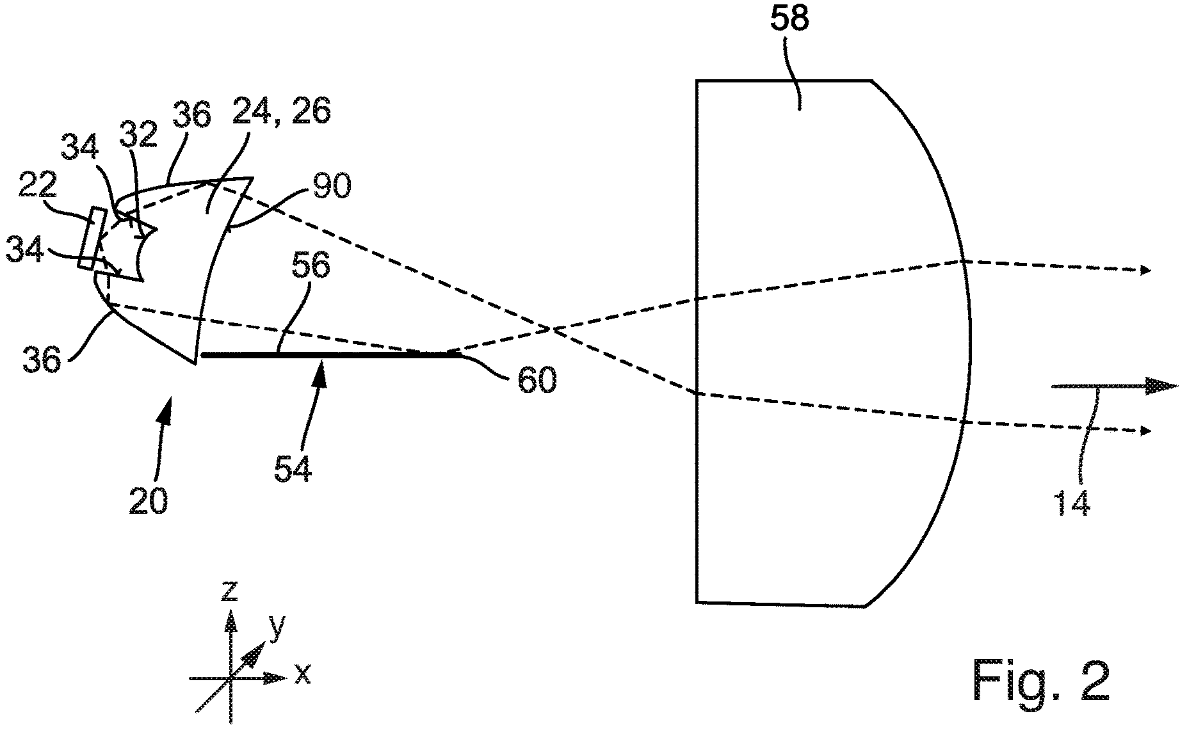
FIG. 2 shows a side view of a light module according to the invention according to another embodiment.

The light module 20 is shown in a cutaway side view in FIG. 2.

The light module 20 comprises at least two adjacent semiconductor light sources 22. Only one of these semiconductor light sources 22 can be seen in FIG. 2.

The light module 20 also comprises at least one primary lens unit 24. The primary lens unit 24 comprises at least two preliminary lenses 26, each of which is dedicated to a respective semiconductor light source 22.

Figure 3:
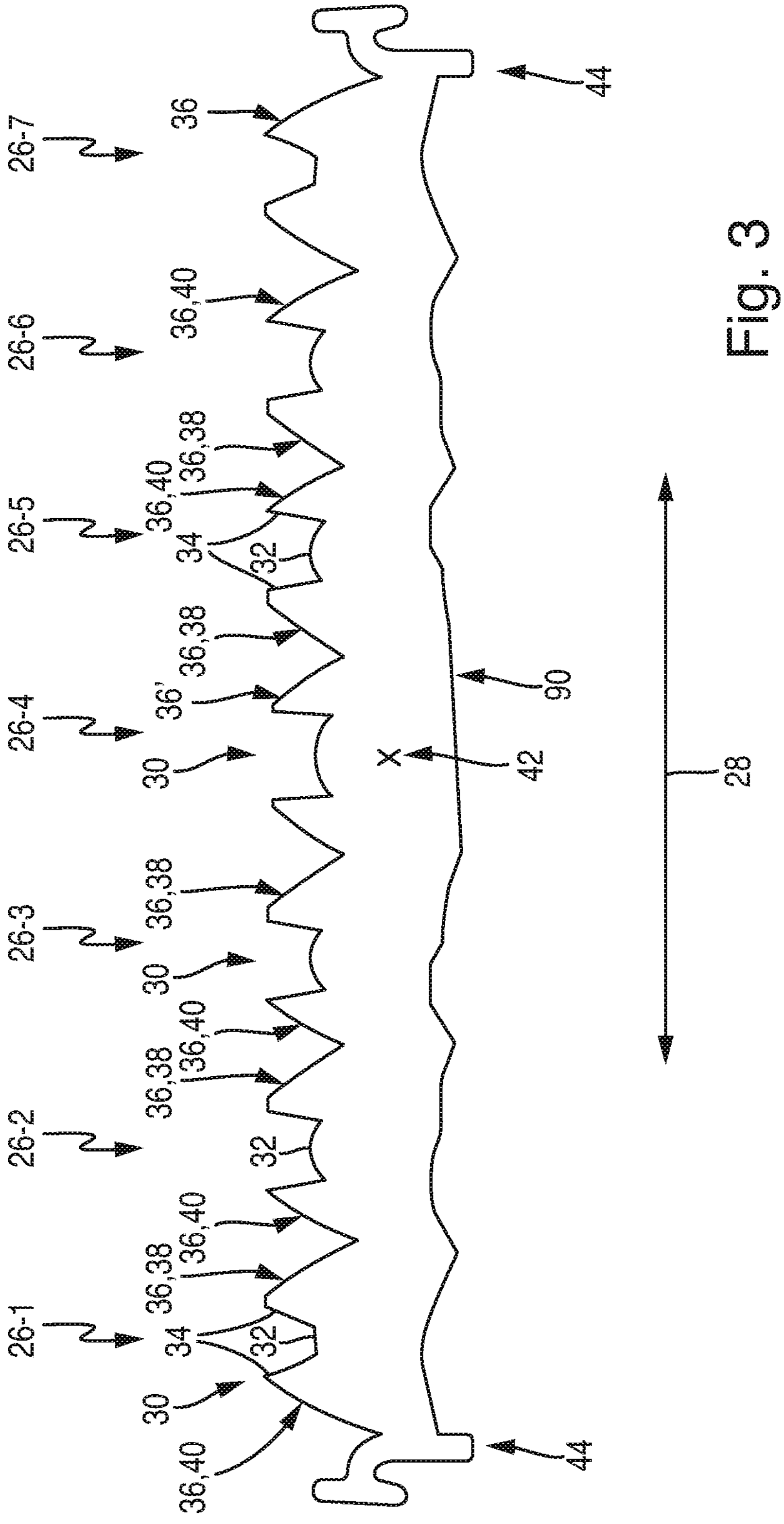
FIG. 3 shows a primary lens for the light module according to the invention, shown in FIG. 2.

FIG. 3 shows an exemplary illustration of the primary lens unit 24. This primary lens unit 24 comprises seven preliminary lenses 26 in FIG. 3, which have the reference numerals 26-1 to 26-7. The primary lens unit 24 according to the invention comprises at least two, or between three and nine, particularly between five and seven, adjacent light sources 22 and at least two, or between three and nine, particularly between five and seven, preliminary lenses, each dedicated to a respective semiconductor light source 22.

It can be seen in FIG. 3 that the preliminary lenses 26 are adjacent to one another along the y-axis in the horizontal extension 28 of the primary lens unit 24.

Each preliminary lens 26 comprises a light entry surface 30, each of which has a central light entry region 32 and a peripheral light entry region 34. The light entry surface 30 is not indicated in all of the preliminary lenses in FIG. 3. The light entry surface 30 can be identical in all of the preliminary lenses 26.

According to this embodiment, the light entry surface 30 is rotationally symmetrical.

The central light entry region 32 forms a preliminary lens, by way of example. The peripheral light entry region 34 expands outward slightly from the central region 32, e.g. in the form of a funnel. Each peripheral light entry region 34 is surrounded by a light deflection region 36.

The light deflection surfaces 36 for the preliminary lenses 26-1, 26-2, 26-3, and 26-5, 26-6, 26-7 are not rotationally symmetrical. The preliminary lenses 26-1, 26-2, 26-3 and 26-5, 26-6, 26-7 can therefore be referred to as preliminary lenses with asymmetrical light deflection surfaces 36.

The asymmetrical light deflection surfaces 36 shall be explained below in reference to the preliminary lens 26-6 shown in FIGS. 4A to 4C. The explanations apply analogously to the preliminary lenses 26-5 and 26-7.

Figure 4A:
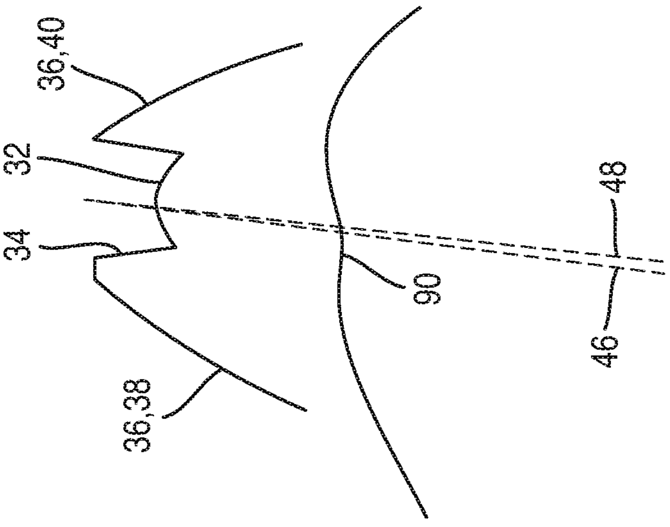
FIGS. 4A-4C show details of the primary lens shown in FIG. 3.
Figure 4B:
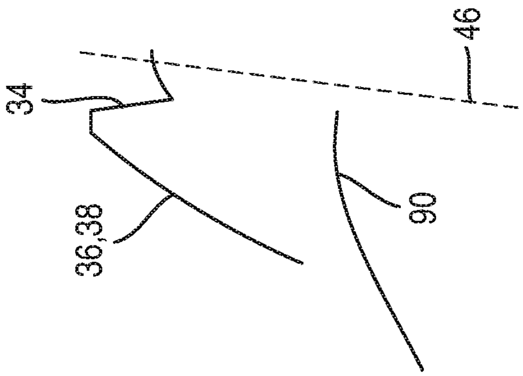
Figure 4C:
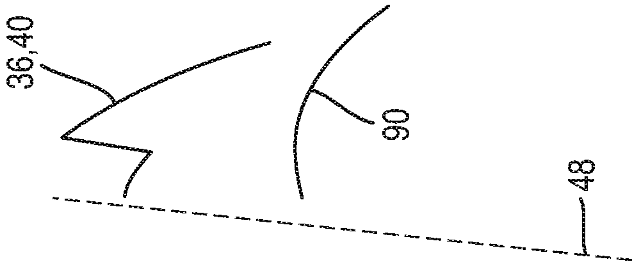

FIG. 4A shows the preliminary lens 26-6 as part of the primary lens 24. The light deflection region 36 in the preliminary lens 26-6 comprises a first subsection 38, shown in FIG. 4B, and a second subsection 40, shown in FIG. 4C. The first subsection 38 is closer to the center 42 of the primary lens unit 24 along the horizontal axis 28 than the second subsection 40. A center 42 is indicated by way of example in FIG. 3. This center does not have to be in the exact middle. Instead, a center in the framework of the invention is understood to be a point in the middle, in particular in relation to the horizontal plane, in the primary lens unit 24. The second subsection 40 is closer to the outer edge 44 of the primary lens unit 24 along the horizontal axis of the primary lens unit 24 than the first subsection 38. A curvature and/or slope of the first subsection 38 is flatter than the curvature and/or slope of the second subsection 40, starting from the peripheral light entry region 34. The curvature and/or slope of the second subsection 40 is steeper than the curvature and/or slope of the first subsection 38, starting from the peripheral light entry region 34.

In this example, the light deflection region 36 comprises curved surfaces. The light deflection region 36 can also comprise flat, slanted surfaces.

The first subsection 38 comprises a first optical axis 46. The second subsection comprises a second optical axis 48. As a result of the difference in the curvature and/or slope of the two subsections 38, 40, the direction of the first optical axis 46 in the first subsection 38 differs from the direction of the second optical axis 48 in the second subsection 40.

The deflection of the light in a direction differing from a main beam direction of the light module 20 is obtained in the light module 20 according to the invention by the design of the light deflection region 36 described here.

Figure 6:
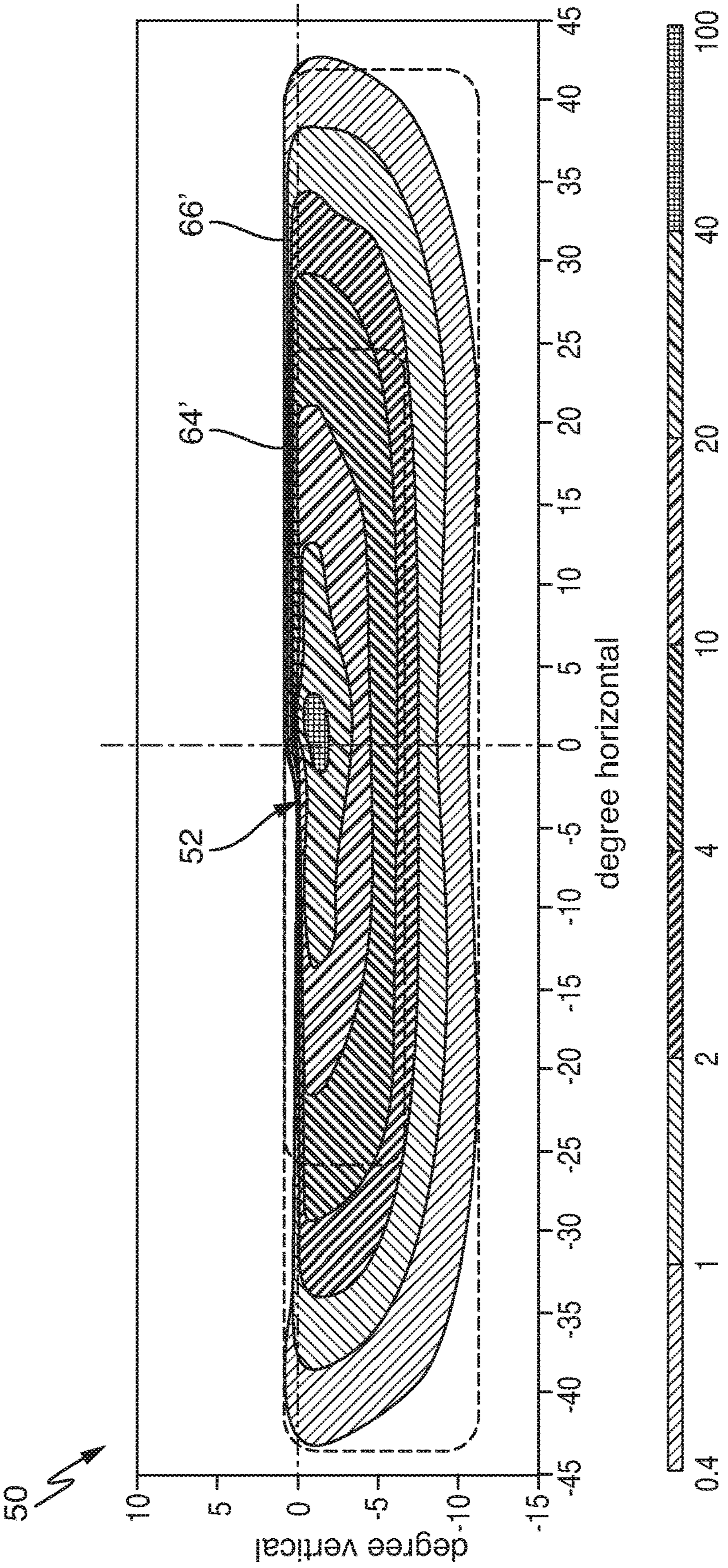
FIG. 6 shows a light distribution that can be generated with the light module according to the invention.

A low beam light distribution 50, shown in FIG. 6, can be obtained with the light module 20, by way of example.

The low beam light distribution 50 has a substantially horizontal light/dark boundary 52, which delimits the light distribution at the top, and is slightly above or below the horizontal plane, e.g. ±1°. The light/dark boundary 52 may be an asymmetrical light/dark boundary 52, i.e. it is higher on the side in the direction of travel than on the side directed toward oncoming traffic, in order to avoid blinding oncoming traffic. The transition in the light/dark boundary 52 between these sections, from the side in the direction of travel to the side directed toward oncoming traffic can have an arbitrary form, e.g. in the form of a steep diagonal or an abrupt step.

A shutter assembly 54 shown in FIG. 2, e.g. in the form of a reflecting shutter, is used to generate the light/dark boundary 52. The shutter assembly 54 is placed in the beam path of the light module 20. At least one surface of the shutter assembly 54 is reflective, by way of example.

The shutter 54 is placed in relation to a secondary lens 58, e.g. a projection lens, such that an edge 60 of the shutter assembly 54 defines the light/dark boundary in the low beam light distribution 50.

The low beam light distribution 50 in FIG. 6 is generated with the primary lens 24. The low beam light distribution 50 is generated by superimposing individual partial light distributions from each of the secondary lenses 26.

Figure 5A:
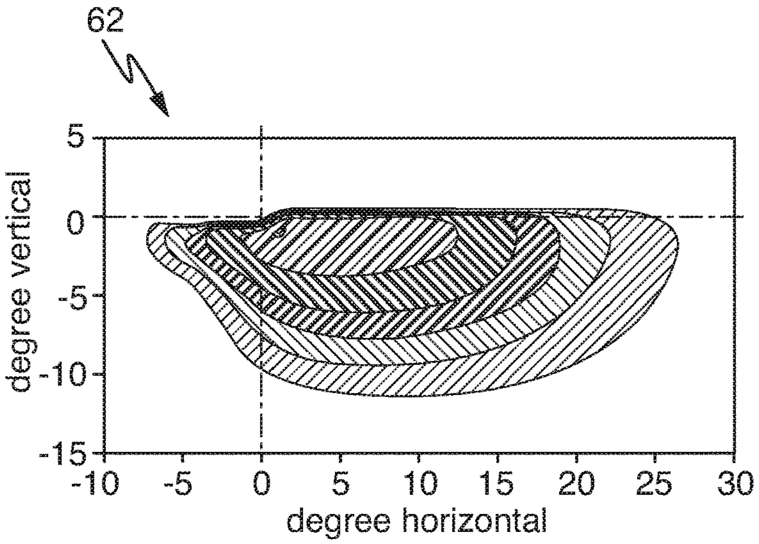
FIGS. 5A-5C show subsections of a light distribution from the light module according to the invention.

FIG. 5A shows a partial light distribution 62 in the low beam light distribution 60 generated with the preliminary lens 26-6.

Light beams that have been deflected at both subsections 38, 40 of the preliminary lens 26-6 are deflected in different directions because of the different optical axes 46, 48 of the two subsections 38, 40, and thus contribute to different portions of the low beam light distribution 50, or the partial light distribution 62 of the low beam light distribution.

Light beams deflected at the first subsection 38 of the preliminary lens 26-6 light a central region 64 in the low beam light distribution 50, or the partial light distribution 62, or a part thereof, where a horizontal plane H and vertical plane V intersect on a measurement screen placed at a distance in front of the light module 20.

The central region 64 spans the area ±15° along the horizontal axis on the measurement screen. The central region 64' extends downward −10°, particularly −7° along the vertical axis from the light/dark boundary 52.

Figure 5B:
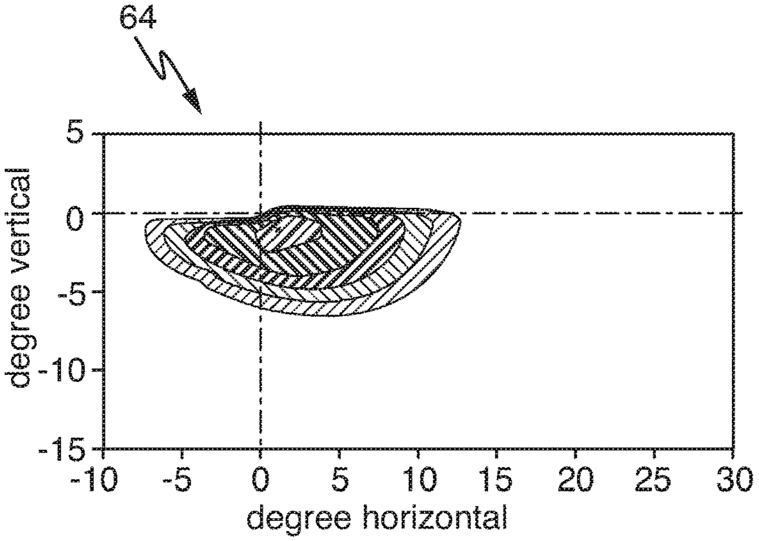

The first subsection 38 of the preliminary lens 26-6 lights a part 64 of the central region 64', as shown in FIG. 5B. By way of example, the first subsection 38 lights an area between −12° and +7° along the horizontal axis and from −7° to the light/dark boundary 52 along the vertical axis. The first subsections 38 in the other preliminary lenses, e.g. 26-1, 26-2, 26-3, 26-5, 26-7, light other parts 64 of the central region 64', each of which are offset thereto. The lighting of the entire central region 64' in the low beam light distribution 50 shown in FIG. 6 is obtained by superimposing the parts 64 of the central region 64' that are lit by the first subsections of the preliminary lenses 26 in the primary lens 24. The light beams deflected at the first subsections 38 therefore light a central region 64' in the low beam light distribution 50.

Light beams deflected at the second subsection 40 of the preliminary lens 26-6 contribute to a wide area 66 in the low beam light distribution 50 or the partial light distribution 62, or a part thereof, along the horizontal axis, on a measurement screen placed at a distance in front of the light module 20. This wide area 66 is wider than the central region 64 lit by the first subsections 38 along the horizontal axis.

The wide area 66' in the low beam light distribution 50 extends along the horizontal plane spanning the area ±45°, particularly ±35°. Along the vertical axis, the wide area 66' extends from −15°, particularly −12°, to the light/dark boundary 52.

Figure 5C:
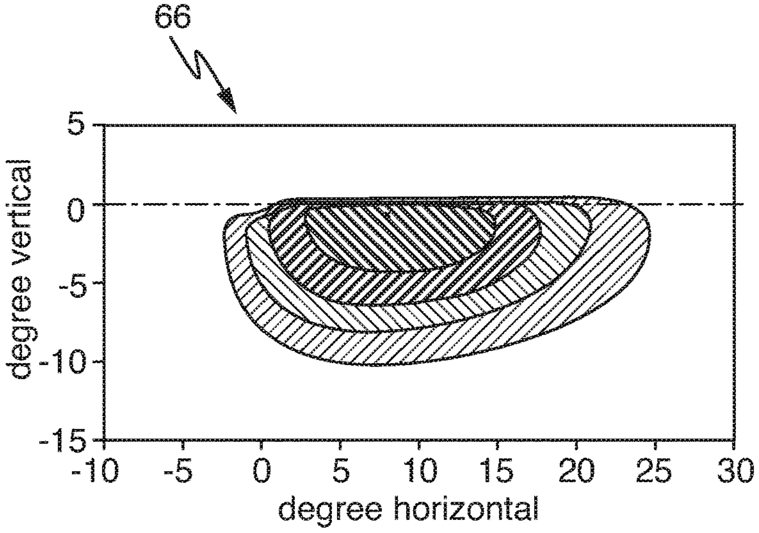

The second subsection 40 of the preliminary lens 26-6 lights a part 66 of the wide area 66', as shown in FIG. 5C. By way of example, the second subsection 40 lights an area between −2° and +25° along the horizontal plane, and from −11° to the light/dark boundary 52 along the vertical plane. The other subsections 40 in the other preliminary lenses, e.g. 26-1, 26-2, 26-3, 26-5, 26-7 light other parts 66 of the wide area 66', each of which are offset thereto. The lighting of the entire wide area 66' in the low beam light distribution 50 shown in FIG. 6 is obtained by superimposing the parts 66 of the wide area 66' lit by the second subsections of the preliminary lenses 26 in the primary lens 24. The second subsections 40 of the preliminary lenses 26 therefore produce a particularly wide fundamental light distribution in the low beam light distribution 50.

The slope and/or curvature of the first and second subsections 38, 40 of the preliminary lenses 26-1, 26-2, 26-3, 26-5, 26-6, 26-7 may vary. By way of example, this difference in this slope and/or curvature of the first and second subsections 38, 40 can be greatest in the outer preliminary lenses 26-1 and 26-7, and it can decrease toward the middle, up to the preliminary lenses 26-3 and 26-5.

The preliminary lenses 26-1, 26-2, 26-3 mirror those shown in FIGS. 5A to 5C, i.e. the first subsections 38 are on the right, and the second subsections 40 are on the left.

According to the embodiment shown here, the light deflection region 36' in the preliminary lens 26-4, which is located in the middle of the preliminary lens 26, is rotationally symmetrical. This is not absolutely necessary, but may be advantageous for purposes of symmetry. The preliminary lens 26-4 is a preliminary lens with a symmetrical light deflection region 36'. By way of example, the light deflection region 36' in the preliminary lens 26-4 lights the central region 52, or a part of the central region 52 in the low beam light distribution 50.

Figure 7:
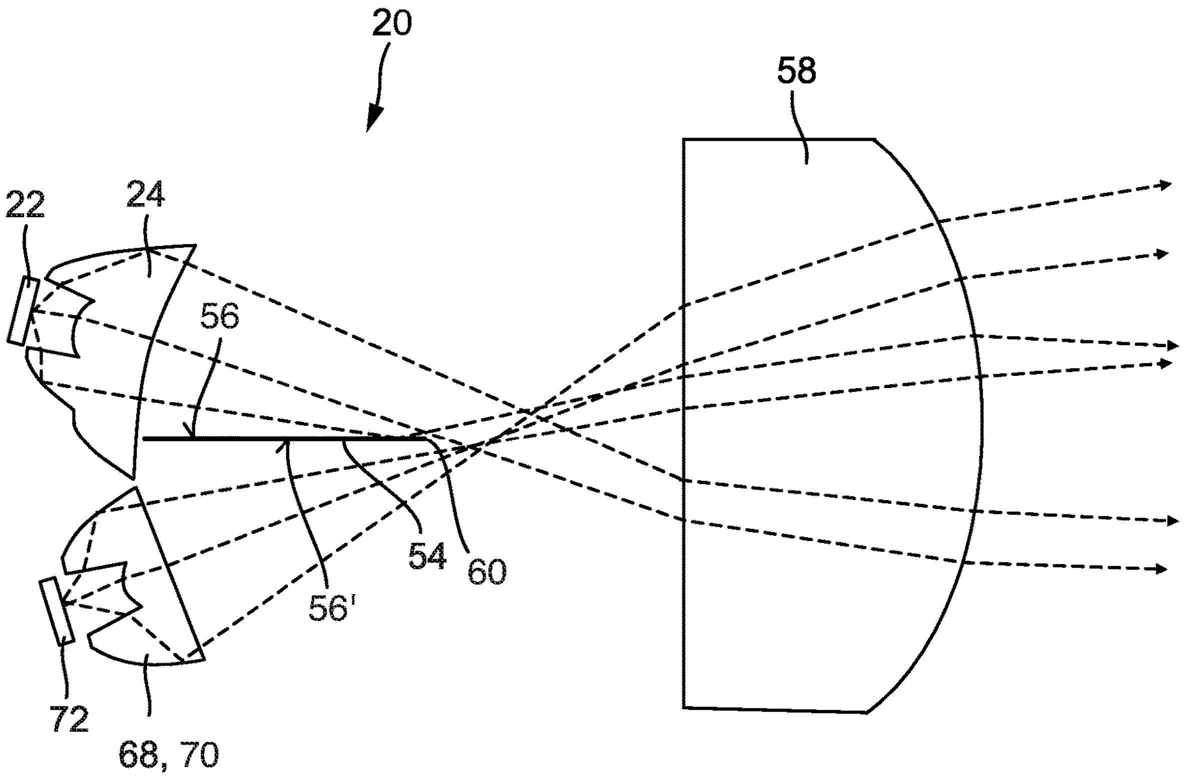
FIG. 7 shows a side view of another embodiment of the light module according to the invention.

FIG. 7 shows another embodiment of the light module 20 according to the invention. In this embodiment, the primary lens 24 in the light module shown in FIG. 2 is supplemented with another set 68 of preliminary lenses 70. By way of example, another set 68 of at least two adjacent preliminary lenses 70 is placed below the preliminary lenses 26. Each of the preliminary lenses 70 in the second set is dedicated to at least one semiconductor light source 72. By way of example, a lower surface 56' of the shutter assembly 54 forms a reflecting surface.

Figure 8A:
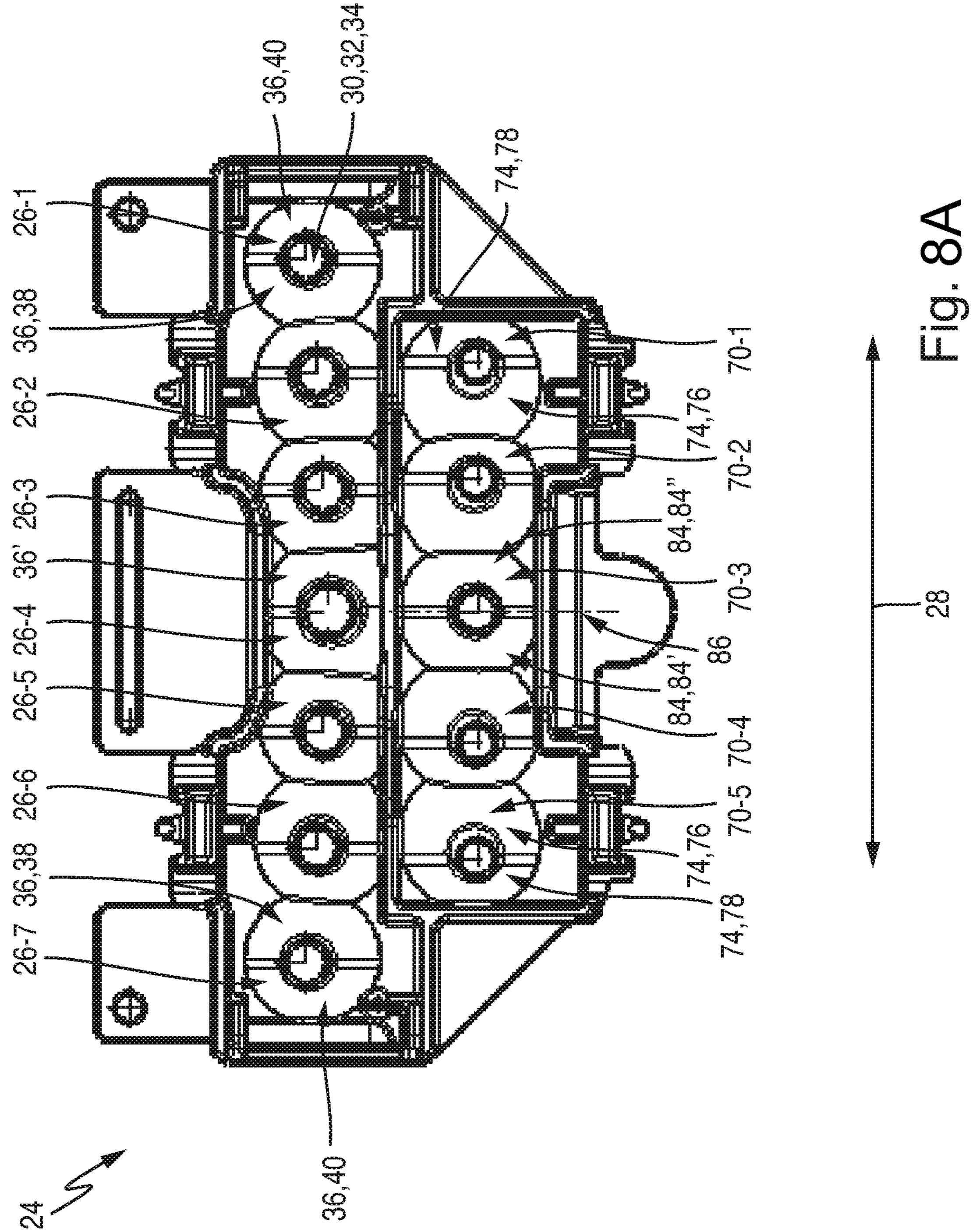
FIGS. 8A-8C show different views of a primary lens for the light module according to the invention shown in FIG. 7.
Figure 8B:
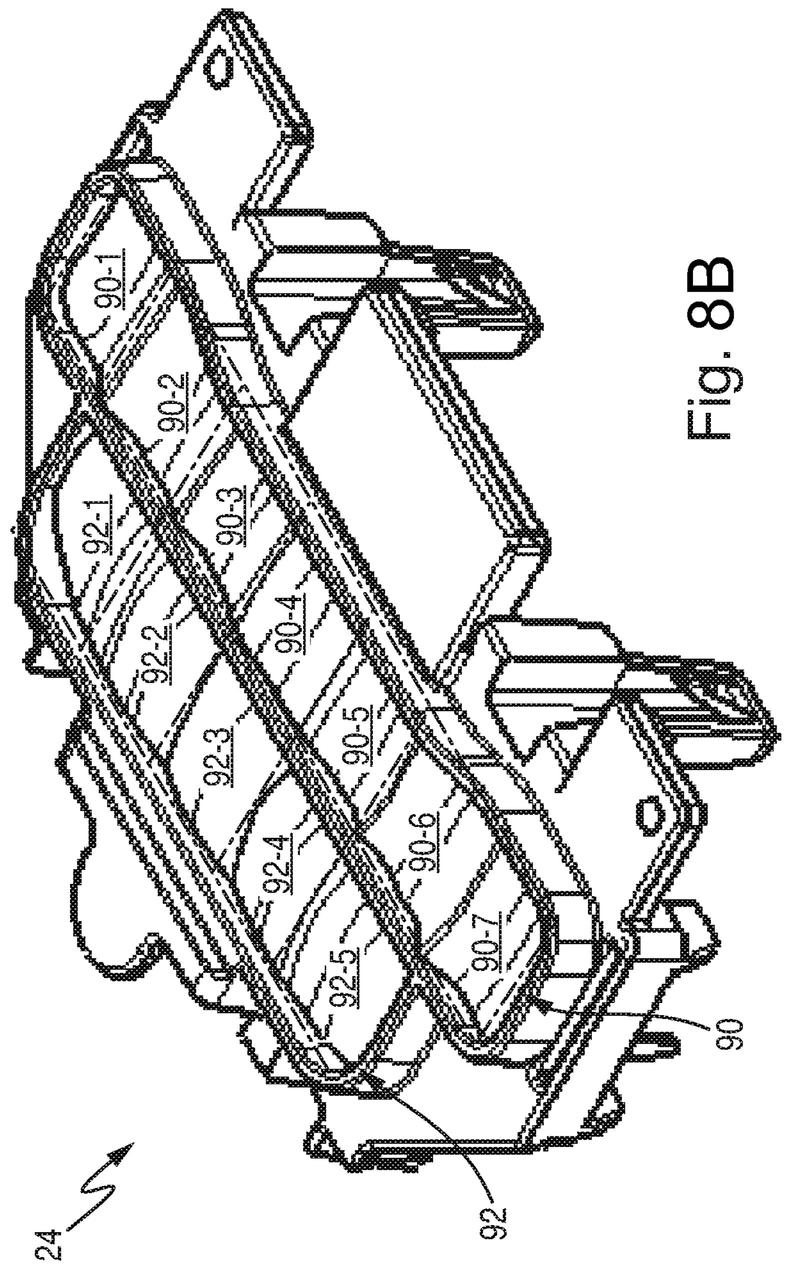
Figure 8C:
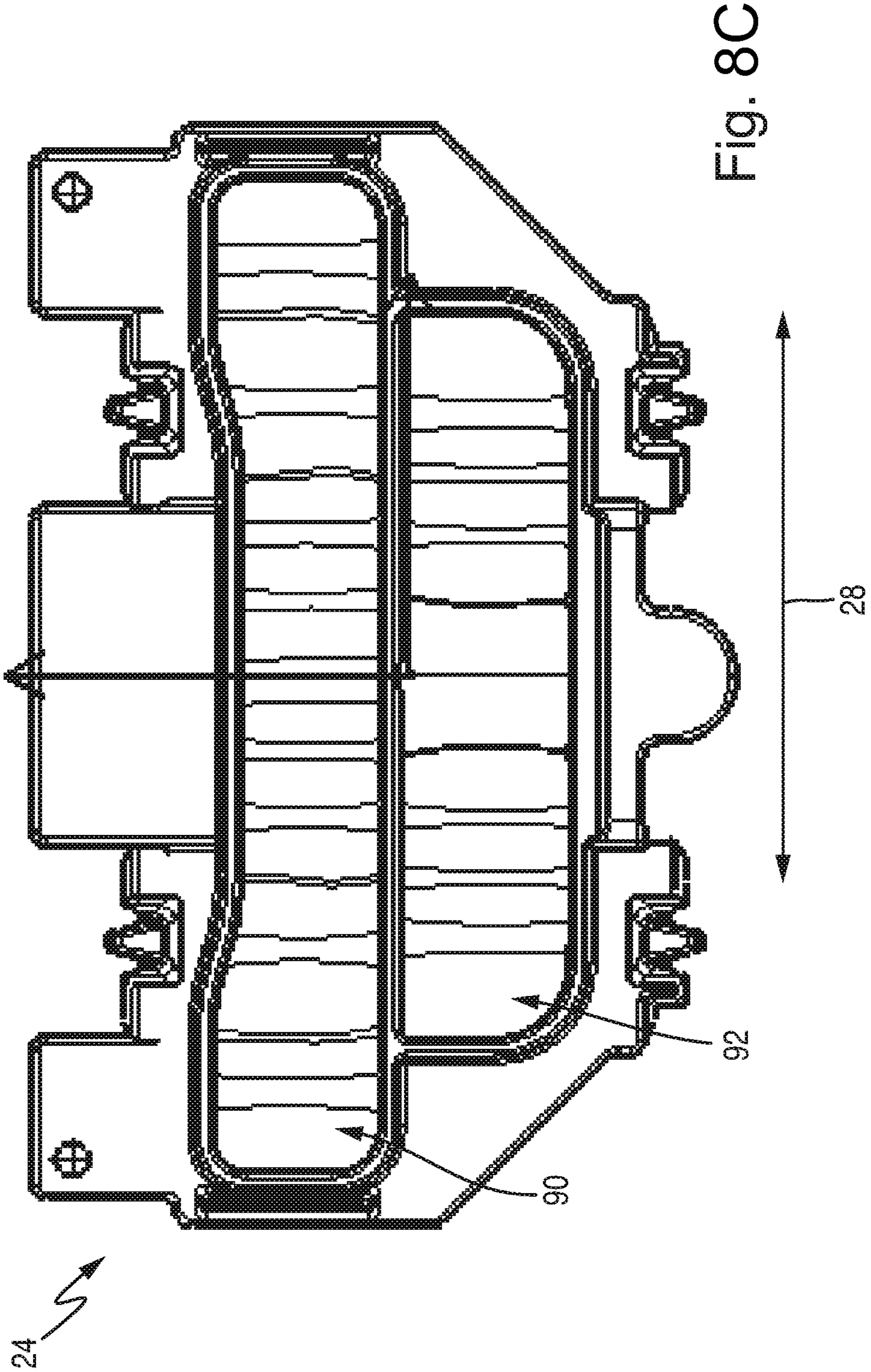

The primary lens 24 can therefore comprise two rows, one containing the preliminary lenses 26 and the other containing the preliminary lenses 70, as shown in FIGS. 8A to 8C. There can also be two separate primary lenses (not shown).

The primary lens 24 is shown in FIGS. 8A to 8C. The primary lens 24 comprises the preliminary lenses 26-1 to 26-7 in an upper row. The preliminary lenses 70-1 to 7-5 are located in a lower row.

The light deflection surfaces 36 and light entry surfaces 30 of the preliminary lenses 26-1 to 26-7 can be seen in FIG. 8A, in a view of the primary lens from behind. By way of example, the first and second subsections 38, 40 of the light deflection surfaces 36 are indicated in the preliminary lenses 26-1 and 26-7.

The preliminary lenses 70-1 and 70-5 can have the same fundamental design as the preliminary lenses 26-1 to 26-7. The preliminary lenses 70-1 to 70-5 also comprise light entry surfaces 30, for example. By way of example, the light deflection surfaces 74 in the preliminary lenses 70-1, 70-2, and 70-4, 70-5 can also comprise first and second subsections 76, 78.

The first subsection 76 is, like the first subsection 38, is closer to the middle 42 of the primary lens unit 24 along the horizontal axis 28 of the primary lens unit 24 than the second subsection 78.

A curvature and/or slope of the first subsection 76 is flatter than the curvature and/or slope of the second subsection, starting from the peripheral light entry region 34. In the second subsection 78, the curvature and/or slope is steeper than the curvature and/or slope of the first subsection 76, starting from the peripheral light entry region 34. As a result, the optical axes of the first and second subsections 76, 78 also differ analogously.

The subsections 76, 78 are designed such that a central region of a partial light distribution is lit with the first subsection 76, and a wider area of a partial light distribution is lit with the second subsection 78.

Figure 9:
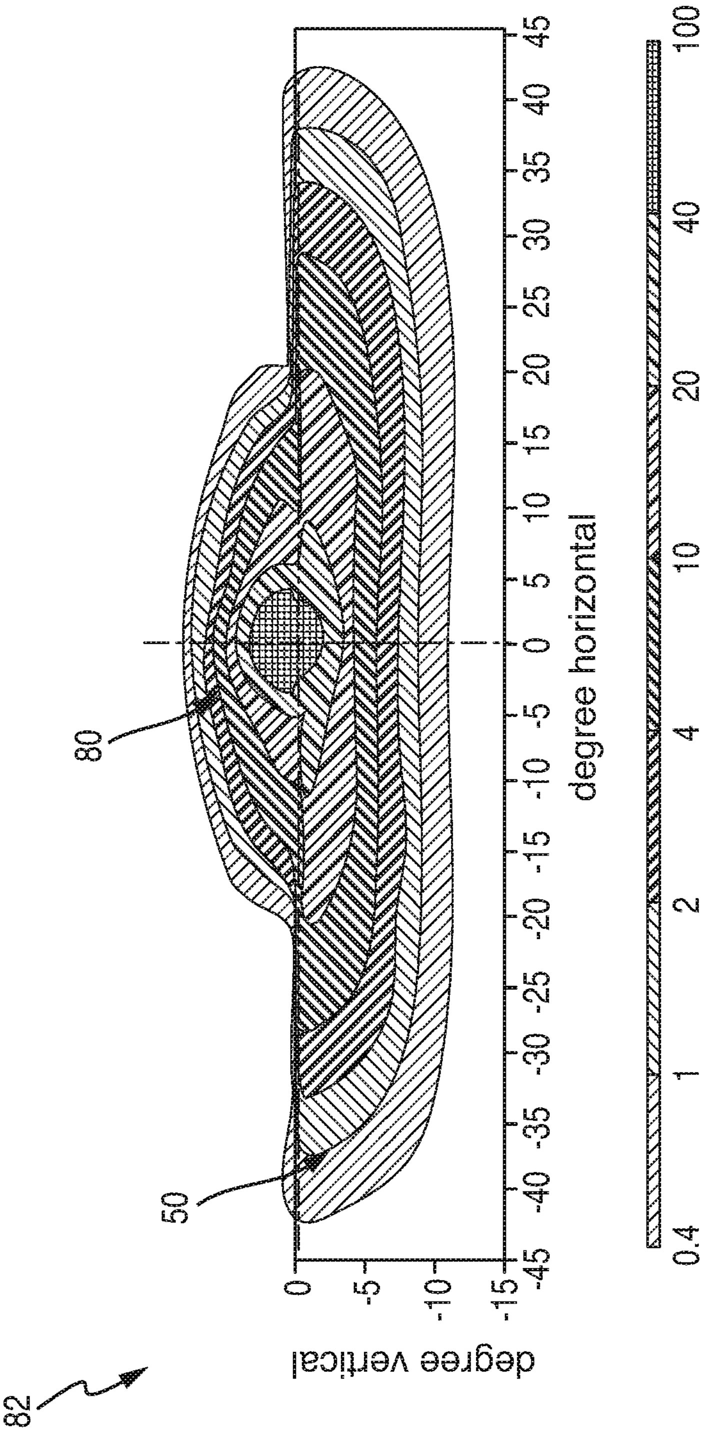
FIG. 9 shows a light distribution that can be generated with the light module according to the invention shown in FIG. 7.

A partial light distribution for a high beam light distribution is generated with the second set 68 of preliminary lenses. By way of example, a partial light distribution can be generated with the second set 68 of preliminary lenses that supplements the low beam light distribution 50 in a region 80 lying above the horizontal plane to obtain a high beam light distribution 82, as shown in FIG. 9.

The first subsections 76 of the preliminary lenses 70-1, 70-2, and 70-4, 70-5 each light a part of the central region, which spans an area ±10° along the horizontal axis on a measurement screen, and extends to +5° above the light/dark boundary.

The second subsections 78 of the preliminary lenses 70-1, 70-2 and 70-4, 70-5 each light a portion of a wide area that spans an area ±22° along the horizontal axis on a measurement screen, and extends to +8° above the light/dark boundary.

The partial light distribution 80 is obtained by superimposing the parts lit by the first and second subsections 76, 78 of the preliminary lenses 70.

A middle preliminary lens 70-3 comprises a deflection region 84 in this example that is symmetrical over the vertical axis. In this case, the subsections 84', 84" are symmetrical in relation to a vertical plane 86.

By way of example, the two subsections 84', 84" in the preliminary lens 70-3 light the central region in the partial light distribution.

According to the embodiment shown here, the respective light deflection surfaces 36, 74, and 84 in the respective preliminary lenses 26, 70 are divided into the first and second subsections along a vertical plane 88 that is perpendicular to the horizontal axis 28, as shown in the illustration of the preliminary lens 70-1, by way of example. This division can also be along a plane that is diagonal to the horizontal axis 28.

The plane 88 does not have to pass through a middle point in the rotationally symmetrical light entry surface 30. The plane can also be displaced along the horizontal axis 28.

The first and second subsections in the preliminary lenses 26, 70 transition smoothly into one another. There are therefore no steps or edges in the respective light deflection surfaces 36, 74, 84 of the preliminary lenses 26, 70.

FIGS. 8B and 8C show the primary lens 24 from a perspective and from the front. The primary lens comprises an upper light emitting surface 90 and a lower light emitting surface 92 in the embodiment shown therein.

The light emitting surfaces 90, 92 can also be connected to form a joint light emitting surface.

The light emitting surface 90 comprises the light emitting surface sections 90-1 to 90-7. These are each dedicated to a preliminary lens 26-1 to 26-7. The light emitting surface 92 comprises light emitting surface sections 92-1 to 92-5. These are each dedicated to a primary lens 70-1 to 70-5. The light emitting surface regions 90-1 to 90-7 and 92-1 to 92-5 transition smoothly into one another. The primary lens 24 therefore comprises two smooth light emitting surfaces 90, 92. The light emitting surfaces 90, 92 on the primary lens 24 therefore do not any have steps or edges.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

The invention claimed is:

1. A light module for a motor vehicle headlamp, said light module comprising:

at least two semiconductor light sources, and at least one primary lens unit, wherein the primary lens unit includes at least two preliminary lenses, each dedicated to a respective semiconductor light source, wherein the preliminary lenses are adjacent to one another along a horizontal axis of the primary lens unit, and wherein each preliminary lens includes a light entry surface with a central light entry region and a peripheral light entry region, and a light deflection surface surrounding the peripheral light entry region, wherein the light deflection surfaces on each preliminary lens include a first subsection and second subsection, wherein the first subsection is closer to the center of the primary lens unit along the horizontal axis of the primary lens unit than the second subsection, and the second subsection is closer to an outer edge of the primary lens unit along the horizontal axis of the primary lens unit than the first subsection, wherein a slope of the first subsection is flatter than a slope of the second subsection, starting from the peripheral light entry region, such that the peripheral light entry region is at a greater angle to the surface of the first subsection than to the second subsection, and the slope of the second subsection is steeper than the slope of the first subsection, starting from the peripheral light entry region, such that the peripheral light entry region is at less of an angle to the surface of the second subsection than to the first subsection, and a direction of a first optical axis of the first subsection differs from a direction of a second optical axis of the second subsection.

2. The light module as set forth in claim 1, wherein a low beam light distribution or a partial light distribution of a low beam light distribution is generated with the light module, such that light beams that are deflected at the first subsections of the preliminary lenses light a central region of the low beam light distribution on a measurement screen placed at a distance in front of the light module in a region surrounding the intersection (HV) of the horizontal axis (HH) and vertical axis (VV).

3. The light module as set forth in claim 2, wherein the light beams deflected at the second subsections of the preliminary lenses light a wide area along the horizontal axis of the low beam light distribution, wherein the wide area is wider horizontally than the central region lit by the first subsections.

4. The light module as set forth in claim 2, wherein each preliminary lens generates a partial light distribution of the low beam light distribution.

5. The light module as set forth in claim 1, wherein the first subsections and second subsections of each preliminary lens transition smoothly into one another.

6. The light module as set forth in claim 1, wherein the light deflection surfaces of each preliminary lens are divided into the first subsection and second subsection along a vertical plane that is perpendicular to the horizontal axis, or along a diagonal plane in relation to the horizontal axis.

7. The light module as set forth in claim 1, wherein the primary lens unit comprises a preliminary lens located in the middle, between the at least two other preliminary lenses, wherein the middle preliminary lens comprises a symmetrical light deflection surface.

8. The light as set forth in claim 1, wherein there are between three and nine, particularly between five and seven, adjacent light sources, wherein the primary light unit includes between three and nine, particularly between five and seven, preliminary lenses, each of which is dedicated to a respective semiconductor light source.

9. The light module as set forth in claim 1, wherein the primary lens unit comprises a light emitting surface and the light emitting surface regions dedicated to the respective preliminary lenses transition smoothly into one another.

10. The light module as set forth in claim 1, wherein a second set of at least two adjacent preliminary lenses is located above or below the at least two preliminary lenses.

11. The light module as set forth in claim 10, wherein a high beam light distribution or a partial light distribution of a high beam light distribution is generated with the second set of preliminary lenses.

12. The light module as set forth in claim 1, further including a shutter assembly that includes a reflective shutter.

13. The light module as set forth in claim 1, further including a secondary lens having a projection lens.

* * * * *